(12) United States Patent
Fish et al.

(10) Patent No.: US 7,856,825 B2
(45) Date of Patent: Dec. 28, 2010

(54) REDUNDANT MOUNTING SYSTEM FOR AN INTERNAL FUEL MANIFOLD

(75) Inventors: Jason Fish, Brampton (CA); Tibor Urac, Toronto (CA)

(73) Assignee: Pratt & Whitney Canada Corp., Longueil (CA)

( * ) Notice: Subject to any disclaimer, the term of this patent is extended or adjusted under 35 U.S.C. 154(b) by 845 days.

(21) Appl. No.: 11/749,230

(22) Filed: May 16, 2007

(65) Prior Publication Data

US 2009/0072051 A1   Mar. 19, 2009

(51) Int. Cl.
*F02C 1/00* (2006.01)
(52) U.S. Cl. .......................... 60/739; 60/796
(58) Field of Classification Search ............... 60/734, 60/796, 798–800, 739
See application file for complete search history.

(56) References Cited

U.S. PATENT DOCUMENTS

| | | | |
|---|---|---|---|
| 1,081,950 A | 12/1913 | Eller | |
| 2,151,540 A | 3/1939 | Varga | |
| 2,443,373 A | 6/1948 | Borsoff | |
| 2,946,185 A | 7/1960 | Bayer | |
| 3,213,523 A | 10/1965 | Boehler | |
| 3,472,025 A | 10/1969 | Simmons et al. | |
| 3,775,975 A * | 12/1973 | Stenger et al. | 60/798 |
| 3,879,940 A * | 4/1975 | Stenger et al. | 60/737 |
| 4,100,733 A | 7/1978 | Streibel et al. | |
| 4,322,945 A | 4/1982 | Peterson et al. | |
| 4,327,547 A | 5/1982 | Hughes et al. | |
| 4,332,626 A | 6/1982 | Hood et al. | |
| 4,377,420 A | 3/1983 | Granatek et al. | |
| 4,404,806 A | 9/1983 | Bell, III et al. | |
| 4,472,133 A | 9/1984 | Petersen et al. | |
| 4,483,137 A | 11/1984 | Faulkner | |
| 4,703,888 A | 11/1987 | Kawamura et al. | |
| 4,870,943 A | 10/1989 | Bradley et al. | |
| 5,036,657 A | 8/1991 | Seto et al. | |
| 5,253,471 A | 10/1993 | Richardson | |
| 5,271,219 A | 12/1993 | Richardson | |
| 5,395,050 A * | 3/1995 | Nowak et al. | 239/121 |
| 5,396,759 A | 3/1995 | Richardson | |

(Continued)

FOREIGN PATENT DOCUMENTS

CA   1013153   7/1977

(Continued)

OTHER PUBLICATIONS

U.S. Appl. No. 11/151,644, Fish.

(Continued)

*Primary Examiner*—Michael Cuff
*Assistant Examiner*—Phutthiwat Wongwian
(74) *Attorney, Agent, or Firm*—Ogilvy Renault LLP

(57) ABSTRACT

A mounting system for an annular internal fuel manifold disposed within a gas generator case of a gas turbine engine including at least one fastener support assembly and at least one receiving element, each fastener support assembly including a primary fastener engaging the receiving element to constrain a relative movement between the fuel manifold and the gas generator case in an axial direction while allowing the relative movement in a radial direction and a secondary fastener in position to passively and automatically engage the receiving element upon failure of the primary fastener.

18 Claims, 4 Drawing Sheets

U.S. PATENT DOCUMENTS

| | | | |
|---|---|---|---|
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A * | 6/1998 | Hansel et al. | 60/739 |
| 5,797,266 A | 8/1998 | Brocard et al. | |
| 5,848,525 A | 12/1998 | Spencer | |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,354,085 B1 * | 3/2002 | Howell et al. | 60/740 |
| 6,463,739 B1 | 10/2002 | Mueller et al. | |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 7,028,484 B2 | 4/2006 | Prociw et al. | |
| 7,370,477 B2 * | 5/2008 | Roche et al. | 60/761 |
| 7,506,514 B2 * | 3/2009 | Muldoon et al. | 60/761 |
| 7,565,807 B2 * | 7/2009 | Prociw et al. | 60/799 |
| 7,669,424 B2 * | 3/2010 | Thornton | 60/796 |
| 7,721,546 B2 | 5/2010 | Fish et al. | |
| 2003/0014979 A1 | 1/2003 | Summerfield et al. | |
| 2005/0188699 A1 | 9/2005 | Shafique et al. | |
| 2006/0156731 A1 | 7/2006 | Prociw et al. | |
| 2006/0156733 A1 | 7/2006 | Prociw et al. | |
| 2006/0218925 A1 | 10/2006 | Prociw et al. | |
| 2008/0016869 A1 * | 1/2008 | Fish et al. | 60/739 |
| 2008/0092545 A1 * | 4/2008 | Fish et al. | 60/739 |
| 2009/0025687 A1 | 1/2009 | Fish | |
| 2009/0084108 A1 | 4/2009 | Prociw | |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2006 |
| WO | WO 9504244 | 2/1995 |

OTHER PUBLICATIONS

U.S. Appl. No. 11/220,849, Prociw et al.
U.S. Appl. No. 11/366,814, Patel et al.
U.S. Appl. No. 11/366,815, Olver.
U.S. Appl. No. 11/366,816, Fish.
U.S. Appl. No. 11/465,655, Morenko.
U.S. Appl. No. 11/466,137, Fish et al.
U.S. Appl. No. 11/489,533, Morenko.
U.S. Appl. No. 11/513,030, Morenko et al.
U.S. Appl. No. 11/532,611, Rudrapatna et al.
U.S. Appl. No. 11/535,185, Morenko et al.
U.S. Appl. No. 11/534,243, Patel et al.
U.S. Appl. No. 11/534,246, Morenko et al.
U.S. Appl. No. 11/534,381, Fish et al.
U.S. Appl. No. 11/552,240, Patel et al.
U.S. Appl. No. 11/552,249, Fish et al.

* cited by examiner

REDUNDANT MOUNTING SYSTEM FOR AN INTERNAL FUEL MANIFOLD

TECHNICAL FIELD

The invention relates generally to an internal fuel manifold for a gas turbine engine and, more particularly, to an improved mounting system for such an internal fuel manifold.

BACKGROUND OF THE ART

Gas turbine engine internal fuel manifolds are typically located inside the gas generator case adjacent the engine combustor, and thus reside in an extremely hot environment. As is typical with other hardware mounted inside a gas turbine engine, the internal fuel manifold must generally be mounted such as to allow for thermal expansion of the manifold and accommodate mismatches in thermal expansion which may exist between components made of different materials.

The mounting system for an internal fuel manifold may be a factor which effects engine durability, as failure of this system can cause fuel to spray onto the combustor liner, causing combustor and hot end durability issues. One solution to generally increase the durability of the mounting system includes providing additional support points between the internal fuel manifold and the gas generator case. However such a solution usually requires relaxation of the tolerances of the support points to allow for assembly, thus undesirably reducing the precision of the location of the fuel manifold within the gas generator case.

Accordingly, improvements are desirable.

SUMMARY

It is therefore an object to provide an improved mounting system for an internal fuel manifold of a gas turbine engine.

In one aspect, there is provided a mounting system for an annular internal fuel manifold disposed within a gas generator case of a gas turbine engine, the mounting system comprising at least one fastener support assembly and at least one receiving element, one of the fastener support assembly and the receiving element being engaged to the internal fuel manifold and the other of the fastener support assembly and the receiving element being engaged to the gas generator case, each fastener support assembly including a primary fastener and a secondary fastener, the primary fastener engaging the receiving element to constrain a relative movement between the fuel manifold and the gas generator case in an axial direction while allowing the relative movement in a radial direction, the secondary fastener being in position to passively and automatically engage the receiving element in the event of failure of the primary fastener, to constrain the relative movement in the axial direction while allowing the relative movement in the radial direction.

In another aspect, there is also provided a mounting system for an annular internal fuel manifold disposed within a gas generator case of a gas turbine engine, the mounting system comprising at least one pair of concentric pins and at least one lug, the pair of pins including a first pin received within a central bore of a second pin, the first and second pins respectively having a first and a second outer end engageable to the gas generator case, the first and second pins respectively having a first and a second inner end projecting radially inwardly with the first inner end protruding from the second inner end when the outer ends are engaged to the gas generator case, the lug being disposed on the fuel manifold in alignment with the pair of pins and having an opening defined therein, the first inner end being received within a first portion of the opening and the second inner end being received within a second portion of the opening such that relative sliding displacement between the inner ends and the opening is permitted along a longitudinal axis of the pills, the inner end of one of the first and second pins being received in the opening with a smaller clearance than that of the other of the first and second pins such as to mate with the lug to constrain a relative motion between the fuel manifold and the case in an axial direction while permitting the relative motion in a radial direction, the other of the first and second pins constraining the relative motion in the axial direction while permitting the relative motion in the radial direction upon failure of the one of the first and second pins.

In a further aspect, there is provided a fuel injection system for gas turbine engine, comprising an annular internal fuel manifold disposed adjacent a combustor of the engine within a surrounding gas generator case, the fuel manifold having at least one fuel conveying passage therein in fluid flow communication with a plurality of fuel injection nozzles disposed along the fuel manifold and adapted to spray fuel into the combustor, and a mounting system supporting and positioning the fuel manifold relative to the combustor within the gas generator case, the mounting system including at least one support assembly disposed between the fuel manifold and the gas generator case, each said support assembly including a pair of fastening elements and a receiving element, the pair of fastening elements including a primary fastening element engaging the receiving element to provide axial constraint while permitting the fuel manifold to radially displace relative to the surrounding gas generator case due to thermal size change, the pair of fastening elements also including a secondary fastening element engaging the receiving element upon failure of the primary fastening element to provide the axial constraint while permitting the fuel manifold to radially displace relative to the surrounding gas generator case due to thermal size change.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
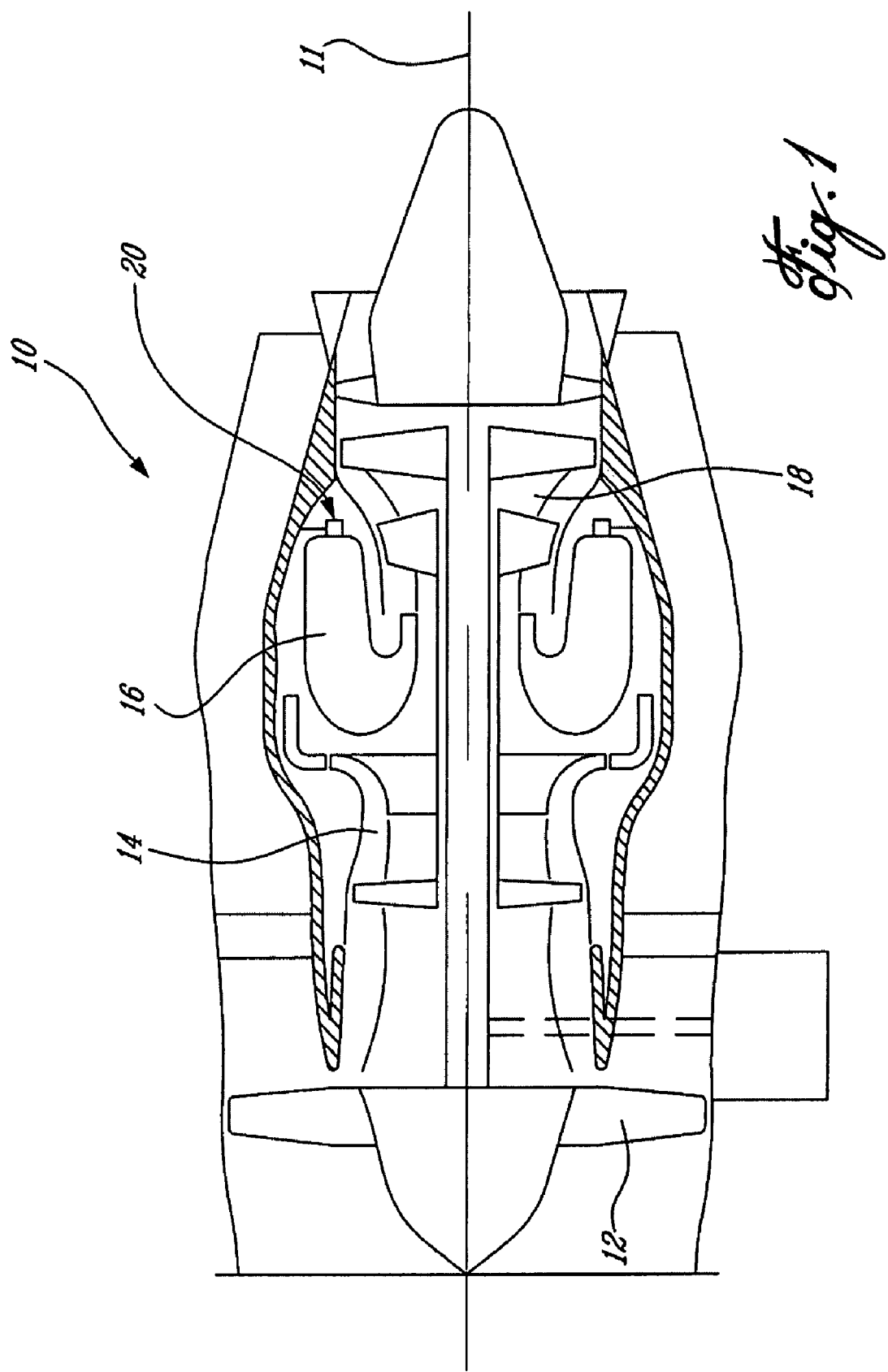
FIG. 1 is schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
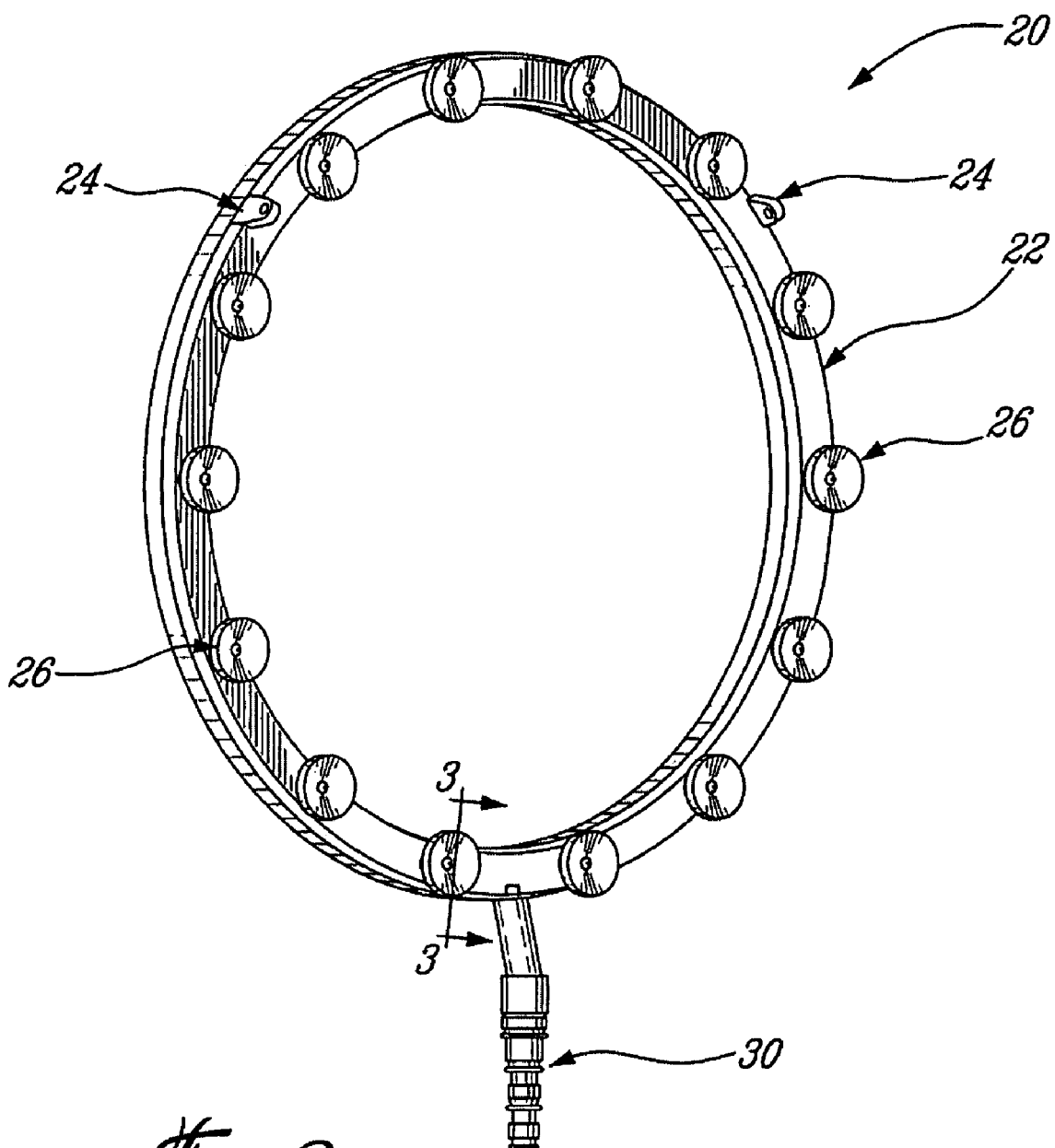
FIG. 2 is an isometric view of a fuel manifold for use in a gas turbine engine such as that depicted in FIG. 1.

Referring to FIG. 2, the fuel injection system 20 includes at least one fuel conveying member through which fuel flows. In the exemplary embodiment, the fuel injection system includes an annular fuel manifold ring 22 and a plurality of fuel injecting nozzle assemblies 26 provided about the circumference of the fuel manifold ring 22. The nozzle assemblies 26 atomize the fuel as it is injected into the combustor 16 for ignition when mixed with the compressed air therein. Fuel enters the annular fuel manifold ring 22 via a fuel inlet tube 30, and is distributed within the manifold ring 22 such that fuel flow is provided to each of the nozzles assemblies 26. Both the fuel manifold ring 22 and the nozzle assemblies 26 comprise fuel conveying members (not shown).

Figure 3:
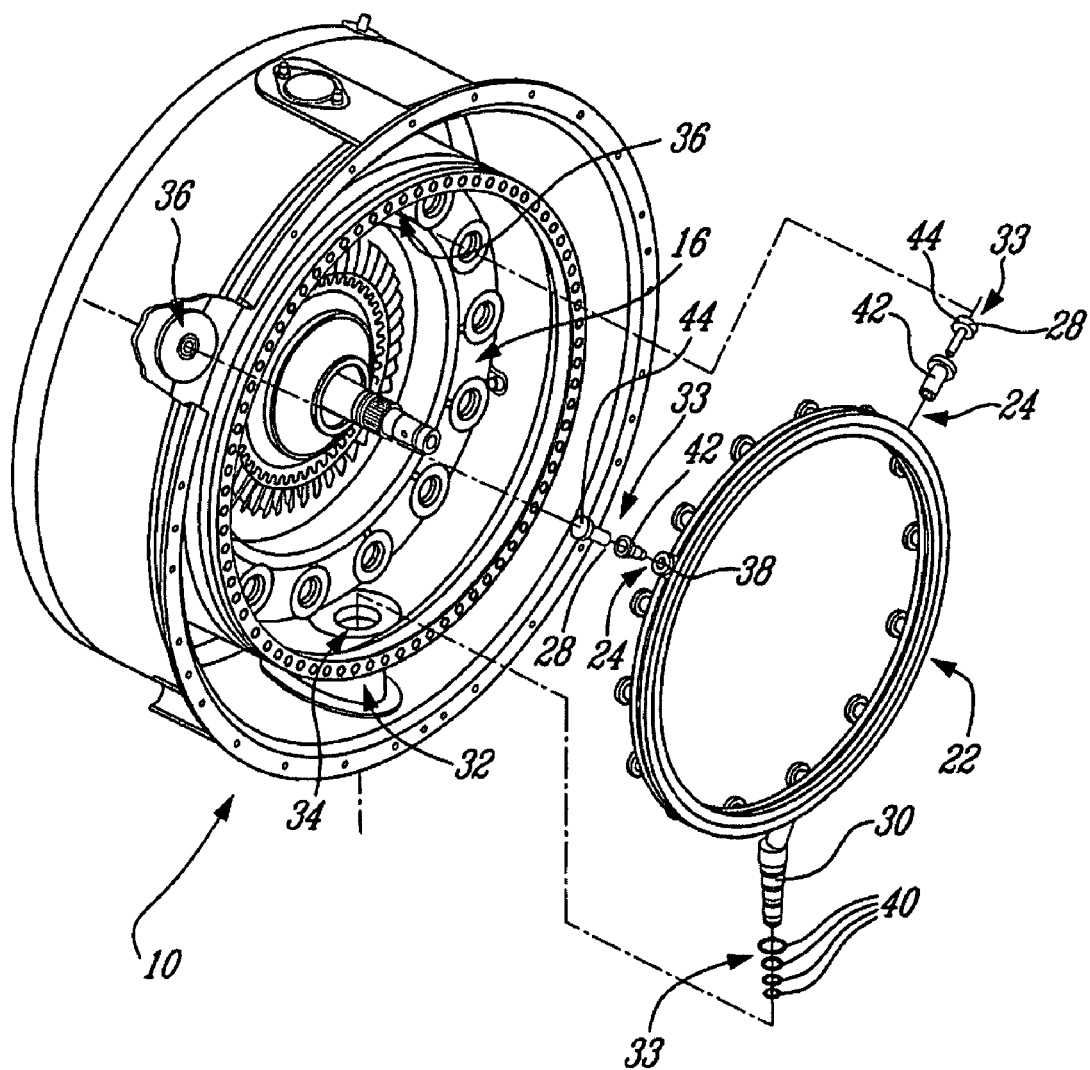
FIG. 3 is an exploded isometric view of a portion of a gas turbine assembly including the fuel manifold of FIG. 2 incorporating a mounting system in accordance with a particular embodiment of the present invention.

Referring to FIG. 3, the fuel manifold ring 22 is installed adjacent to the combustor 16 by a mounting system supporting and positioning the fuel manifold ring 22 within a gas generator case 32 of the gas turbine engine 10. In a particular embodiment, the mounting system includes three support points 33 preferably equally spaced apart about the circumference of the annular fuel manifold (i.e. spaced 120 degrees apart) such as to define a Y-shaped support configuration, in order to help balance radial and axial loads between the three support points 33. In the embodiment shown, the support points 33 are defined by two fastener support assemblies 28 and by the interaction between the fuel inlet tube 30 and the gas generator case 32. As will be discussed further below, the mounting system allows for thermal expansion of the fuel manifold ring 22 at high temperatures.

The lower portion of the manifold ring 22 is supported within the gas generator case 32 by one of the support points 33 which is defined by the generally radial insertion of the radially extending fuel inlet tube 30 within a boss 34 in the gas generator case 32. A plurality of o-rings 40 are provided around the inlet tube 30 for sealing and the inlet tube 30 is received within a bushing in the boss 34 and held therein by a loose fit, such that sliding radial displacement of the inlet tube 30 within the bushing of the case 32 is allowed. As such, radial growth between the fuel manifold ring 22 and the surrounding case 32 is permitted at the inlet tube 30. In a particular embodiment, the inlet tube is identical to that described in pending U.S. patent application Ser. No. 11/488,801 filed Jul. 19, 2006, the contents of which is incorporated herein by reference.

In the embodiment shown, the inlet tube 30 is located at the bottom or lower most point (i.e. the 6 o'clock position) of the annular fuel manifold 22 when the engine 10 is horizontal, such as when the engine 10 is disposed in a normal flight attitude position for example, as shown in FIG. 3. Alternate locations for the inlet tube 30 are also possible.

Referring again to FIG. 3, the upper portion of the manifold ring 22 is supported within the gas generator case 32 by the remaining two support points 33 each being defined by a fastener support assembly 28. Each fastener support assembly 28 includes a pair of fastening elements extending from the case 32 and one receiving element provided on the manifold ring 22 and engaging the fastening elements. In the embodiment shown, each receiving element includes an attachment lug 24 integral with the manifold ring 22 and defining a radially extending opening 38, and each pair of fastening elements includes a pair of concentric radially extending pins 42, 44.

Figure 4:
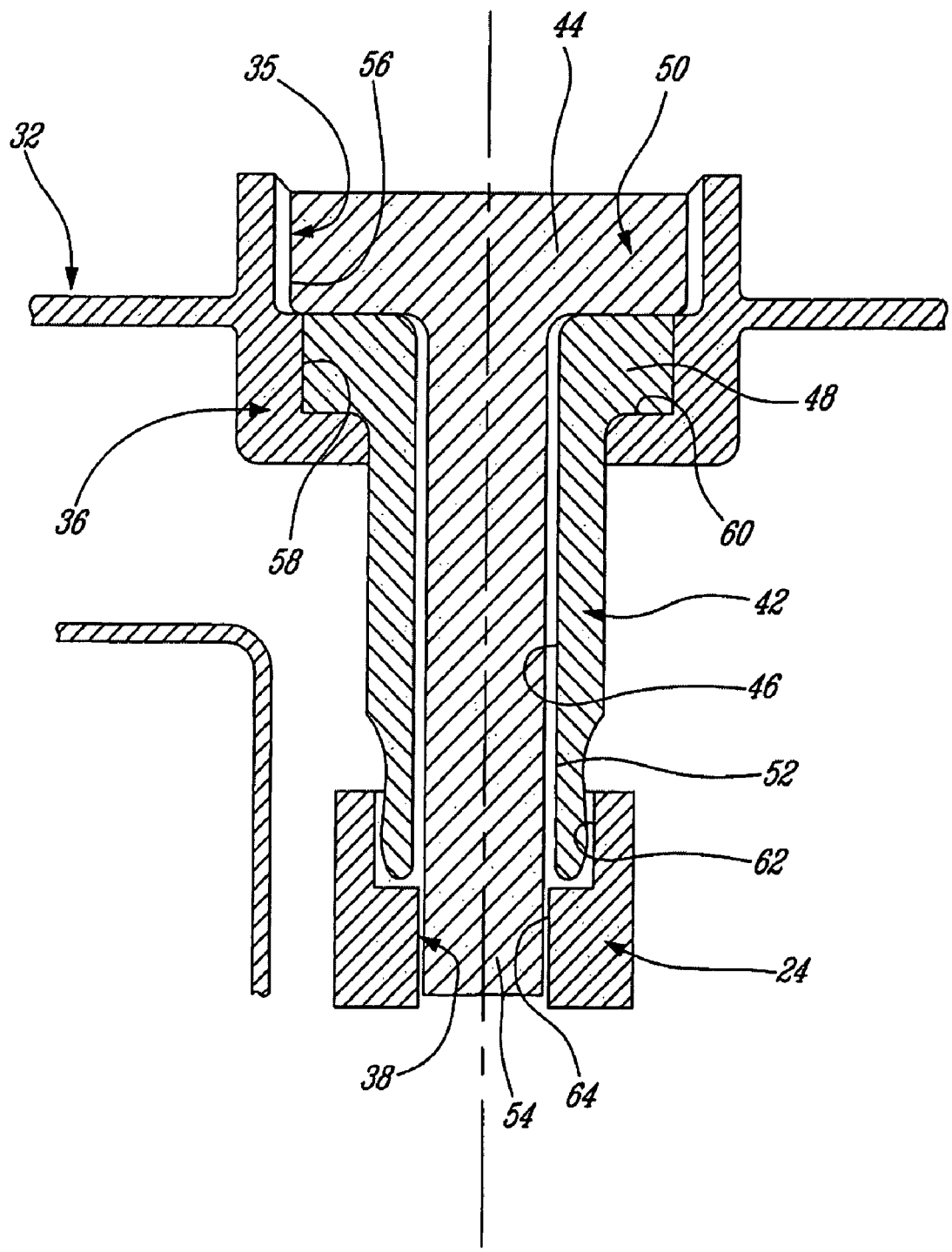
FIG. 4 is a cross-sectional view of part of the mounting system of FIG. 3.

Referring to FIG. 4, each pair of pins includes a primary pin 42 having a central bore 46 defined therethrough, and a secondary pin 44 received within the central bore 46 of the primary pin 42, preferably such as to be freely slidable therein. The primary and secondary pin 42, 44 each have a respective outer end 48, 50 engaged in a same opening 35 of a corresponding boss 36 defined in the gas generator case 32, and a free inner end 52, 54 extending inwardly into the gas generator case 32 and adapted to pass generally radially through the opening 38 of the corresponding lug 24 of the fuel manifold ring 22.

The opening 35 of the boss 36 includes a threaded portion 56 and an unthreaded portion 58 defined radially inwardly of the threaded portion 56. The unthreaded portion 58 defines a shoulder 60 against which is received the outer end 48 of the primary pin 42, and the outer end 50 of the secondary pin 44 is threaded for engagement with the threaded portion 56 of the opening 35 in abutment with the outer end 48 of the primary pin 42. As such, the outer end 48 of the primary pin 42 is engaged to the case 32 by the outer end 50 of the secondary pin 44 which maintains it against the shoulder 60.

Alternately, the threaded engagement between the outer end 50 of the secondary pin 44 and the boss opening 35 can be replaced by any suitable method of attachment, either permanent or removable, such as by nut, lock-pin, bonding, welding, compression flange, etc. In addition or alternately, the outer end 48 of the primary pin 42 can be engaged to the case 32 in a direct manner instead of being engaged to the case 32 by the outer end 50 of the secondary pin 44, either permanently or removably, using any adequate method such as for example by direct threaded engagement, nut, lock-pin, bonding, welding, compression flange, etc.

In a particular embodiment, anti-rotation of the pins 42, 44 is provided by an anti-rotation ring (not shown) mounted to the pins 42, 44 and engaging the boss 36 of the case 32.

The opening 38 within each lug 24 includes first and second portions 62, 64 which in the embodiment shown have different diameters so that the opening 38 is stepped. The inner end 52 of the primary pin 42 is received within the first portion 62 of the lug's opening 38 with a first clearance, while the inner end 54 of the secondary pin 44 protrudes from the inner end 52 of the primary pin 42 and is received within the second portion 64 of the lug's opening 38 with a second clearance which is greater than the first clearance. As such, the interaction between the lug 24 and the primary pin 42 allows for relative radial sliding displacement between the manifold ring 22 and the case 32 while constraining their relative axial movement, with little or preferably no interaction between the secondary pin 44 and the lug 24 due to the greater associated clearance. As such, the primary pin 42 takes up at least a major portion, and preferably all, of the load transferred by the lug 24, and radial growth between the fuel manifold ring 22 and the surrounding case 32 is permitted at the lugs 24 as well as at the inlet tube 30 as described above.

The secondary pin 44 acts as a back up fastening element and takes the place of the primary pin 42 when the primary pin 42 fails. As the secondary pin 44 is already in place within the opening 38 of the lug 24, the replacement of the primary pin 42 by the secondary pin 44 as the fastening element upon failure of the primary pin 42 is done passively, i.e. without requiring any movement of the secondary pin 44, and automatically. As such, upon failure of the primary pin 42, the secondary pin 44 starts interacting with the lug 24 to constrain the relative axial movement between the manifold ring 22 and the case 32 while allowing for their relative radial sliding displacement, and takes up the load transferred by the lug 24 in place of the primary pin 42. As the secondary pin 44 has little or no interaction with the lug 24 until failure of the primary pin 42, the presence of the secondary pin 44 does not increase the number of support points 33 in the mounting system. In addition, the fact that the primary and secondary pins 42, 44 are concentric further ensures that any interaction between the secondary pin 44 and the lug 24 prior to the failure of the primary pin 42 occurs at the same support point 33 defined by the primary pin 42.

In an alternate embodiment which is not shown, the primary pin 42 is received in a central bore defined through the secondary pin 44. In this case the primary pin 42 is preferably also directly engaged to the gas generator case 32 (e.g. direct threaded engagement, nut, lock-pin, bonding, welding, compression flange). Other alternate embodiments also include embodiments where the pins 42, 44 are not concentric with no interaction occurring between the secondary pin 44 and the lug 24 prior to the failure of the primary pin 42 such as not to increase the number of support points 33.

Axial and radial loads for supporting the fuel manifold ring 22 can therefore be borne by all the three support points 33, which are defined by the interaction of the fuel inlet tube 30 with the boss 34 and by each fastener support assembly 28. That is, the weight of the fuel manifold ring 22 is distributed about the three support points 33, as are any other forces, acting on the fuel manifold ring 22, such as fuel pressure, vibrations, engine loads, etc. The term radial and axial loads as used herein is understood to mean loads which the support points 33 must bear in the radial and axial directions relative to the engine axis 11 in order to adequately support the fuel manifold ring 22 in a correct position within the gas generator case 32 in relation to the combustor 16. In normal flight attitude, the weight of the manifold ring 22 is generally supported by the fastener support assemblies 28 as well as by the inlet tube 30, although the fastener support assemblies 28 support a majority of the weight of the manifold ring 22 during normal engine operation, at least partially due to their angled orientation.

Each of the three support points 33 allows for relative thermal size change (i.e. thermal growth and/or reduction) between the fuel manifold ring 22 and the gas generator case. Accordingly, the radially sliding fit between the pins 42, 44 and the lugs 24 and between the fuel inlet tube 30 and the mating bushing of the case 32 allow the ring 22 to thermally grow and shrink radially (i.e. with reference to the engine axis 11), without introducing any significant stress on the inlet tube 30 or the lugs 24, while axially constraining the fuel manifold ring 22 within the case 32.

In an alternate embodiment, the inlet tube 30 is not load bearing, i.e. does not provide one of the support points 33, and each of the support points 33 is instead provided by a respective pin and lug assembly, and preferably by a fastener support assembly 28 comprising primary and secondary pins 42, 44 as described above.

In the embodiment shown, the support points 33 are thus limited to three points located within a common axial plane (i.e. with reference to the engine axis 11) within the gas generator case 32 such as to fix the axial location of the fuel manifold ring 22 within the case 32, as three represents the minimal number of support points required to define an axial plane within which the fuel manifold must be located. As such, (see FIG. 3) the fastener support assemblies 28, as well as the inlet tube 30 when the inlet defines a support point 33, are located within a common axial plane. Accordingly, the number of support points 33 for the fuel manifold ring 22, the load on each support point 33, and tolerance stack-ups can be minimised. The primary and secondary pins 42, 44 thus allow to keep the number of support points 33 to a minimum while increasing the durability of the mounting system, since the secondary pins 44 automatically replace the primary pins 42 upon their failure without increasing the overall number of support points 33 of the mounting system.

The term "constraint" or "constraining" as used herein is intended to mean limiting movement and/or thermal size change, and as such the support points 33 are said to be axially constraining as they limit substantially axial movement or growth of the fuel manifold ring 22, while nonetheless allow displacement in a radial direction such as to accommodate radial thermal growth/shrinking.

The above description is meant to be exemplary only, and one skilled in the art will recognize that changes may be made to the embodiments described without department from the scope of the invention disclosed. For example, alternate configurations of the fuel conveying members such as the fuel manifold ring 22 and the nozzle assemblies 26 can be used. Other types of adequate fastening elements can be used instead of the pins 42, 44, and other types of adequate receiving elements (e.g. adequate integral features on the manifold ring) can be used instead of the lugs 24, depending on the fastening elements used. The fastening elements can alternately be provided on the manifold and the receiving elements on the case. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

What is claimed is:

1. A mounting system for an annular internal fuel manifold disposed within a gas generator case of a gas turbine engine, the mounting system comprising at least one fastener support assembly and at least one receiving element, one of the fastener support assembly and the receiving element being engaged to the internal fuel manifold and the other of the fastener support assembly and the receiving element being engaged to the gas generator case, each fastener support assembly including a primary fastener and a secondary fastener, the primary fastener engaging the receiving element to constrain a relative movement between the fuel manifold and the gas generator case in an axial direction while allowing the relative movement in a radial direction, the secondary fastener being in position to passively and automatically engage the receiving element in the event of failure of the primary fastener, to constrain the relative movement in the axial direction while allowing the relative movement in the radial direction, and wherein the primary and secondary fasteners include radially extending concentric pins comprising a secondary pin disposed within a primary pin and extending the length thereof, and the receiving element includes a lug defining an aligned opening receiving inner ends of both the primary and secondary pins, the concentric primary and secondary pins being slideable relative to each other along a longitudinal axis of the pins.

2. The mounting system as defined in claim 1, wherein the mounting system includes three support points, each of at least two of the support points being defined by one of the at least one fastener support assembly cooperating with one of the at least one receiving element.

3. The mounting system as defined in claim 2, wherein the fuel manifold includes a radially extending fuel inlet tube, the fuel inlet tube being received within a corresponding bushing of the gas generator case in a radially slidable relationship to define one of the three support points.

4. The mounting system as defined in claim 1, wherein the fastening support assembly is engaged to the gas generator case and the receiving element is engaged to the fuel manifold.

5. The mounting system as defined in claim 4, wherein each of the fastening elements has an outer end removably engaged to the gas generator case such that each of the fastening elements is replaceable.

6. The mounting as defined in claim 5, wherein the outer end of the secondary fastening element is fastened directly to the gas generator case and the outer end of the primary fastening element is retained to the gas generator case by the outer end of the secondary fastening element.

7. The mounting system as defined in claim 1, wherein the fastening elements extend radially, the secondary fastening element being received within a central bore defined through the primary fastening element, the secondary fastening element having a free end protruding from an end of the primary fastening element cooperating with the receiving element.

8. A mounting system for an annular internal fuel manifold disposed within a gas generator case of a gas turbine engine, the mounting system comprising at least one pair of concentric pins and at least one lug, the pair of pins including a first pin received within a central bore of a second pin, the first and second pins respectively having a first and a second outer end engageable to the gas generator case, the first and second pins respectively having a first and a second inner end projecting radially inwardly with the first inner end protruding from the second inner end when the outer ends are engaged to the gas generator case, both the first and second inner ends of the first and second pins being received within the lug, the lug being disposed on the fuel manifold in alignment with the pair of pins and having an opening defined therein, the first inner end being received within a first portion of the opening and the second inner end being received within a second portion of the opening, the concentric first and second pins being slideable relative to each other along a longitudinal axis of the pins, the inner end of one of the first and second pins being received in the opening with a smaller clearance than that of the other of the first and second pins such as to mate with the lug to constrain a relative motion between the fuel manifold and the case in an axial direction while permitting the relative motion in a radial direction, the other of the first and second pins constraining the relative motion in the axial direction while permitting the relative motion in the radial direction upon failure of the one of the first and second pins.

9. The mounting system as defined in claim 8, wherein the first outer end includes a thread cooperating with a corresponding threaded portion of a boss defined in the gas generator case and within which the first outer end is received to engage the first outer end to the gas generator case.

10. The mounting system as defined in claim 9 wherein the boss includes an unthreaded portion defined radially inwardly of the threaded portion, the unthreaded portion including a shoulder against which the second outer end is received, the second outer end being maintained against the shoulder and engaged to the gas generator case by the first outer end threadingly engaged to the threaded portion of the boss and abutting the second outer end.

11. The mounting system as defined in claim 8, wherein the one of the first and second pins is the second pin.

12. The mounting system as defined in claim 8, wherein the first pin is slidably received within the central bore of the second pin.

13. The mounting system as defined in claim 8, wherein the at least one pair of concentric pins includes two pairs of concentric pins and the at least one lug includes two lugs, each of the pair of concentric pins defining a support point together with a corresponding one of the lugs, and the mounting system further comprises an additional support point provided by a radially extending fuel inlet tube of the fuel manifold slidably received in a corresponding bore of the case.

14. A fuel injection system for gas turbine engine, comprising:
an annular internal fuel manifold disposed adjacent a combustor of the engine within a surrounding gas generator case, the fuel manifold having at least one fuel conveying passage therein in fluid flow communication with a plurality of fuel injection nozzles disposed along the fuel manifold and adapted to spray fuel into the combustor; and
a mounting system supporting and positioning the fuel manifold relative to the combustor within the gas generator case, the mounting system including at least one support assembly disposed between the fuel manifold and the gas generator case, each said support assembly including a pair of fastening elements and a receiving element, the pair of fastening elements including a primary fastening element extending into and engaging the receiving element to provide axial constraint while permitting the fuel manifold to radially displace relative to the surrounding gas generator case due to thermal size change, the pair of fastening elements also including a secondary fastening element extending into the receiving element such as to engage the receiving element upon failure of the primary fastening element to provide the axial constraint while permitting the fuel manifold to radially displace relative to the surrounding gas generator case due to thermal size change, and wherein the primary and secondary fastening elements are concentric and include radially extending primary and secondary pins, the secondary pin being disposed within the primary pin and extending the length thereof, the primary and secondary pins being slideable relative to each other along a longitudinal axis of the pins, and the receiving element includes a lug defining an aligned opening receiving inner ends of both the primary and secondary pins.

15. The fuel injection system as defined in claim 14, wherein the mounting system includes three support points, at least two of the support points being defined by one of the at least one support assemblies.

16. The fuel injection system as defined in claim 15, wherein the fuel manifold includes a radially extending fuel inlet tube providing fuel flow to the fuel conveying passage, the fuel inlet tube being received within a corresponding bushing of the gas generator case in a radially slidable relationship to define one of the three support points.

17. The fuel injection system as defined in claim 14, wherein the fastening elements are engaged to the gas generator case and the receiving element is engaged to the fuel manifold.

18. The fuel injection system as defined in claim 14, wherein the fastening elements are concentric and extend radially, the secondary fastening element being received within a central bore defined through the primary fastening element, the secondary fastening element having a free end protruding from an end of the primary fastening element cooperating with the receiving element.

* * * * *